United States Patent
Arentsen et al.

(10) Patent No.: US 6,521,147 B1
(45) Date of Patent: Feb. 18, 2003

(54) METHOD AND APPARATUS FOR MANUFACTURING FIBER-REINFORCED, FOAMED PAPERLIKE PRODUCTS

(75) Inventors: Jan Hendrik Adolf Arentsen, Lochem (NL); Jan Wietze Huisman, Bellingwolde (NL)

(73) Assignee: Vertis B. V. (NL)

( * ) Notice: Subject to any disclaimer, the term of this patent is extended or adjusted under 35 U.S.C. 154(b) by 0 days.

(21) Appl. No.: 09/269,318

(22) PCT Filed: Sep. 27, 1996

(86) PCT No.: PCT/NL96/00377
§ 371 (c)(1),
(2), (4) Date: Dec. 2, 1999

(87) PCT Pub. No.: WO98/13184
PCT Pub. Date: Apr. 2, 1998

(51) Int. Cl.[7] .............................. B29C 44/02; B29C 44/20
(52) U.S. Cl. .......................... 264/45.3; 264/51; 264/53; 264/211.11; 264/328.18
(58) Field of Search ....................... 264/51, 53, 328.18, 264/45.3, 55, 211.11

(56) References Cited

U.S. PATENT DOCUMENTS

| | | | | |
|---|---|---|---|---|
| 5,252,271 A | * | 10/1993 | Jeffs | 264/51 |
| 5,376,320 A | * | 12/1994 | Tiefenbacher et al. | 264/50 |
| 5,405,564 A | * | 4/1995 | Stepto et al. | 264/328.18 |
| 5,476,621 A | * | 12/1995 | Kustner | 264/53 |
| 5,618,341 A | * | 4/1997 | Anderson et al. | 106/287.35 |
| 5,709,827 A | * | 1/1998 | Andersen et al. | 264/102 |
| 5,916,503 A | * | 6/1999 | Rettenbacher | 264/53 |
| 5,965,080 A | * | 10/1999 | Ando et al. | 264/51 |
| 6,251,318 B1 | * | 6/2001 | Arentsen et al. | 264/45.5 |

* cited by examiner

Primary Examiner—Allan R. Kuhns
(74) Attorney, Agent, or Firm—Michaelson & Wallce; Peter L. Michaelson; Jeremiah G. Murray

(57) ABSTRACT

A method for manufacturing products with a blown foamy structure, starting from a mass comprising at least natural polymers such as starch and fibers, in particular natural fibers, wherein the mass (M, S) is passed under pressure into or through a mould (23, 63) and the mass (M, S) is heated in the mould (23, 63) in a manner such as to give rise to gelatinization and cross-linking of the natural polymers, with the fibers extending through the product, while the mass prior to the introduction into the mould has temperature which is below the gelatinization temperature and in the mould is brought at least to the baking temperature.

24 Claims, 3 Drawing Sheets

METHOD AND APPARATUS FOR MANUFACTURING FIBER-REINFORCED, FOAMED PAPERLIKE PRODUCTS

The invention relates to a method for manufacturing foamed products according to the preamble of claim 1. Such a method is known from International patent application WO 96/05254. The invention further relates to an apparatus that can be used therefor and to products that can be obtained according to this method.

The products to be manufactured according to the invention have a foamy structure. More particularly, the foamy material always comprises at least three parts: two relatively dense layers on the outside, which, as it were, form a skin, and between them a foam structure as core. The dense layers are firm and strong and consist of substantially closed, small cells. The foam structure of the core is generally open, which means that the cells have burst to allow the gasses evolving during the manufacture, for instance water vapour or carbon dioxide, to escape. The cells generally have a firm and solid cell wall due to the relatively high pressure and temperature during the process. In the manufactured product, the fibers extend between and possibly partly through the cells and are mainly intricately connected to the material of the cells.

In this description, "gelatinization" is understood to mean a change of a natural polymer from a slightly or completely loose granular or comparable granulate form into a cohesive form which may or may not be dry and/or foamed, in which stretched polymers are present. That is to say, a transition occurs from a solid substance, a colloidal solution or suspension to a more homogenous fluid mass. Depending on the polymers used, "gelatinization" should therefore be understood to include, for instance, gelling, gellating and the like.

In foamed products where only gelatinization occurs, as a result of gas evolution, bubbles are formed in the mass to be foamed, substantially after gelatinization. This process occurs at relatively lower temperatures and pressures. Over the entire cross section, such products have approximately the same structure of relatively small cells with walls of substantially uncross-linked natural polymers.

In this description, "baking" is understood to mean a method in which both gelatinization and cross-linking occur, at relatively high temperatures and/or pressure. As a result, the formation of gas arises relatively soon, so that bubbles are already formed prior to or during gelatinization. As a result of inter alia the high pressure adjacent strongly heated parts, the polymers cross-link quickly when using a mould or like baking form with a temperature at or above the baking temperature.

These baked products have a core with relatively large cells, enclosed between skin parts with relatively small cells. The cell walls have a relatively high density and the natural polymers included therein are cross-linked to a high extent, which means that they have entered into mutual chain bonds. Such a baked product therefore has a sandwich-like structure.

In the method known from WO 96/05254 and WO 95/20628, an open platen set is employed, wherein products are manufactured from a batter comprising natural polymers, inorganic filler, water and fibers. The batter is introduced into the bottom half of an open platen set, for instance a baking iron, after which the platen set is closed and heated, so that the batter is gelantinized. The products obtained are thin-walled and biodegradable, which is advantageous from an environmental point of view. The fibers added have the advantage that an increase of the product strength is thereby obtained relative to products wherein such fibers have not been added. Such products are for instance known from WO91/12186.

A disadvantage of the use of platen sets is that the batter is introduced into an open mould which is subsequently closed and, for instance, is passed through a continuous oven, where it is heated, for instance by gas burners. Energetically speaking, this is little efficient and moreover the temperature in the baking mould is not properly controllable and may vary strongly during the baking process, which is not beneficial to the quality of the products. Moreover, the products which are obtained according to this method are not particularly dimensionally stable and allow no or only very slight differences in wall thickness, because otherwise no homogenous structure can be obtained. A further disadvantage of this method is that the introduction of the batter and the removal of the product is very laborious and will often lead to failure in the production. Moreover, with this method no products can be manufactured that are non-withdrawable, so that the freedom of design is limited.

In a further method according to WO 96/05254 a powderlike mixture of natural polymers, inorganic filler, water and fibers is introduced into a conventional EPS mould by use of an airstream through said mould. The mixture is heated inside the mould by use of heated steam, in order to provide for gelatinization and foaming of the mixture for forming the desired article.

In this method the mixture is introduced into the mould relatively slowly, which results in relatively long production times and can only be used with moulds having relatively easy designs and short flow paths. Furthermore, the products resulting from this method have to be stabilized by conditioning them, resulting in even longer production cycles.

European patent application 0 118 240 discloses a method for manufacturing biodegradable medicament capsules and like products by injection-moulding from a starch composite. To that end, a starch mixture with a low water content is introduced into a closed space, in particular the hopper of an injection-moulding machine, where plasticization of the mixture is provided for at a suitable specific temperature, pressure and humidity. The temperature and pressure are increased to such an extent that the mixture is adjusted to above the verification point. Thereafter the plasticized mixture is forced into a cooled mould and maintained under pressure, until the or each product has cooled off sufficiently, whereafter the mould is opened and emptied.

The advantage of this known method is that dimensionally stable biodegradable products can be manufactured relatively fast. However, the possible dimensions of products that can be manufactured with this method are limited, owing to the flow path in the mould. In fact, the plasticized mass forced into the mould is cooled directly, which gives rise to solidification and prevents flow of the mass relatively soon after entry of the mould. Moreover, no cross-linking of the starch in the mass occurs, so that the products have relatively weak strength properties and exhibit relatively poor resistance to water and moist conditions in general. In a moist environment the products will take up a great deal of water and thereby become slack; conversely, in a dry environment moisture will evaporate from the products, so that they become hard and brittle. The products obtained with this method have a high density and have no foamy structure.

International patent application 95/04104 discloses a method for manufacturing foamed, biodegradable products from starch-containing raw materials, in which an amount of a starch is liquefied in a pre-stage by heating to a temperature far above the gelatinization temperature, whereafter an amount of water-saturated ramie fibers is admixed. This mixture is thereafter passed into or through the mould or converted to a dry granulate. Upon heating of the mixture, the water is to escape from the ramie fibers and to function as blowing agent. When using this known method, a substantially dry granulate of starch is to be strongly heated in the pre-stage, which granulates therefore cannot form a liquid batter. This known method has the disadvantage that the raw materials are to be supplied in relatively dry form and in the pre-stage are to be mixed with the moist fibers under simultaneous increase of the temperature in the tank, whereby the desired gelatinization occurs. To that end, the mixture must be heated, which is difficult to effect homogenously in view of the relatively large mass. As a consequence, the process is relatively poorly controllable. A further disadvantage is that the products obtained in this way have only limited durability and are not water-resistant and moreover are not particularly dimensionally stable. With this method, the freedom of design is limited. Hence, this method suffers from the drawbacks mentioned in respect of the gelatinization of the mass prior to its introduction into the mould.

Further, European patent application 0 634 261 discloses a method for manufacturing biodegradable products utilizing a kind of injection-moulding technique, which starts from a mixture of a first and second biodegradable starting material. The first has a melting temperature of above 100° C., the second of less than 100° C. Either a substance which contains water is added to the starting material, or water is incorporated in the starting material, in such a manner that it can provide for the blowing of the cells. In an extruder press, the mass is heated to above the gelatinization temperature of at least the first starting material, mixed and pressurized and subsequently sprayed into a mould cavity provided in a pressurized space. After introduction of the mass, the pressure is removed, so that the water in the mass expands, blows the cells and exists through the permeable wall of the mould cavity. Such a method requires a complicated composition of starting materials. Further, this known apparatus has the above-mentioned disadvantages resulting from the gelatinization of at least a part of the mass prior to its introduction into the mould. In particular, as a result of inter alia the porous walls, the outer wall portions of the products manufactured according to this method will not have a dense, compact wall but a uniform distribution of cells of uniform size throughout the product thickness.

The object of the invention is to provide a method for manufacturing foamed products, in which the supply of the starting material is simple, in which the manufactured products are simple to remove from the mould, which involves a relatively great moulding freedom and whereby the manufactured products have a good dimensional stability and exhibit relatively good resistance to different conditions, including moist environments and temperature fluctuations, which products can moreover be integrated in a paper-reuse flow (paper recycling).

Owing to the supply of the mass from which the or each product is to be formed at a temperature which is below the gelatinization temperature, the supply of the mass can be realized in a simple manner, for instance via pumps and pipes. Moreover, a stock of the mass can be priorly prepared and be fed to a processing apparatus directly from a storage tank. By subsequently passing the mass under pressure into or through the mould and only heating it in the mould, it is ensured that the mould is always filled sufficiently. The flow path, that is, the or each path traversed by the mass to and in the mould can then be long to very long with respect to the cross sections of the passages. Only in the mould, the eventual gelatinization of the natural polymers occurs and then cross-linking of those polymers.

Due to the cross-linking that occurs, a firm product is obtained. The natural polymer provides for a relatively firm skeleton which extends around preferably continuous cells that form in the mould due to moisture or other blowing agents which, as a result of the heat in the mould, attempts to escape from the mass and due to the pressure in the mould, forms bubbles. As a result, the product obtained has a blown foamy structure. Since the natural polymer provides for a relatively stiff jacket, the thus obtained product is dimensionally stable upon exiting from the mould. Depending inter alia on the extent of cross-linkage, the product obtained is more or less flexible.

Since the mould is heated and not the mass prior to being forced into the mould, the temperatures in the mould can be properly controlled, both for the mould as a whole and for each separate portion thereof. As a result, products can be manufactured with different and verying wall thickness and with different mechanical properties. In fact, by heating more or less and/or for a longer or shorter period and adjusting, for instance, the pressure, for instance the extent of cross-linkage of the polymers can be controlled locally, so that the mechanical and physical properties are influenced. All this can be simply determined by those skilled in the art.

Heating the mass to the baking temperature, hence in excess of 100° C., offers the advantage that the occurrence of fungoid growth is prevented, or at least substantially slowed down. The addition of fibers, in particular natural fibers, offers the advantage that the products are more dimensionally stable after injection moulding and heating, and remain shape-retaining, also in moist conditions. The products obtained with a method according to the invention are relatively strong and compression-resistant, impact-resistant and relatively elastic, insulating and can be reduced without involving fragmentation. After use, the products can be included in an existing waste flow for, for instance composting or, more advantageously, in a paper-recycling flow.

By utilizing natural fibers, in particular fibers of, for instance, annual plants and/or recycled fibers such as cellulose fibers from paper and wood waste, significant advantages are realized in terms of environment and manufacture. For instance, the emission of harmful substances is reduced, if not prevented, during manufacturing as well as during waste processing. As no fossil resources are used in the products, the processing thereof will cause no permanent increase of $CO_2$ in the atmosphere, so that these products do not contribute to the so-called hothouse effect.

A further important advantage realized through the addition of fibers is that the obtained product retains its original shape and properties longer than it does without fibers. It is true that composing, i.e. the biological degrading process, proceeds relatively slowly, so that the product is less suitable for inclusion in a flow of vegetable, fruit and garden waste, but the product is thereby sufficiently durable for being able to serve as, for instance, packaging material, also if the articles packaged therein are stored and/or dispatched for a long time, or under unfavorable conditions, such as high temperature and/or high air humidity. When further preserved, products manufactured according to the invention are suitable as constructional elements, building parts and the like. These products are durable, light, mouldable, insulating and of sandwiched-shaped composition.

A product manufactured according to the invention is in general self-extinguishing, whereas comparable products manufactured from, for instance, (paper) pulp or EPS are relatively combustible. Moreover, the manufacture of such pulp products is labor-intensive and costly, the products are less strong, heavy, little resistant to, for instance, high temperatures and moisture, and the freedom of design is slight. A number of these and comparable drawbacks occur with comparable products manufactured from plastic, such as polystyrene foam and the like.

By controlling the process conditions, in particular the feed rate of the mass, the temperature of the mould and the pressure in the mould, a product is manufactured in which the cells are smaller adjacent the mould wall then centrally between the walls of the mould. In other words, in the product the cell size increases from the inside to the outside. Thus, a relatively closed, water-tight skin is obtained which properly protects the product from premature decline, while the inside of the product comprises relatively large cells which can keep the product light and flexible. Moreover, the foam-shaped inside is particularly favorable for obtaining and increasing the insulating action. A further advantage of the skin with a relative large density is that, as a result, a taut and smooth surface is obtained which affords the product an agreeable appearance, has a pleasant feel, is simply removable from the mould, is simply printable and moreover hygienic. Accordingly, in contrast with the known methods, a cell structure is obtained which is non-homogenous, at least viewed across the wall thicknesses.

The use of recycled fibers, for instance paper fibers or like cellulose fibers, offers the advantage that a relatively cheap and environmentally friendly basic material can be used. Such recycled fibers are relatively cheap and widely available. Moreover, a product obtained according to such method can, after use, be incorporated into the same waste flow and reused in such products.

By using fibers coming from annual plants, in particular by only using fibers which preferably come from annual plants and/or from recycling, the advantage is achieved that products can be manufactured in a particularly environmentally friendly manner. The use of fibers from annual plants is preferred to fibers from, for instance, trees, because these annual plants are quickly renewable, are relatively cheap and readily available. Moreover, the use of annual plants stimulates diversification in agriculture. In particular wood cutting is not necessary for this. Further, annual plants produce relatively long fibers. When used, these fibers have the advantage that the flexibility of the products obtained is considerably increased thereby. The fibers act as a kind of reinforcement.

By coating at least a portion of the fibers to be used in the method, water absorption by the fibers is limited to a minimum, at least to a favorable low value. This limits or prevents thickening of the mass, so that the processing thereof remains possible in an simple manner, also in the case of relatively long paths of flow. Moreover, the baking process is accelerated thereby, because less water needs to be evaporated, which is also favorable from an energetic viewpoint. Moreover, the coating enables in a particularly simple manner the addition of additives to the mass. The coating can for instance consist of means for obtaining a better bond between the fibers and, for instance, the starch from which the cells are blown. Moreover, the coating can contain for instance, a blowing agent, colorants, natural anti-fungal agents, flavorings and/or fragrances, and the like.

The addition of at least 0.5% and preferably between 2% and 25% fibers offers the advantages that the mass can be introduced into the mold in a relatively simple and suitable manner and results in a proper distribution thereof in the mold, while the above-mentioned advantages are achieved. In particular when 4–15% fibers is added, particularly favorable results are achieved.

The addition of 15–75% dry substance in the mass, and more advantageously between 20–60% dry substance yields advantageous results. In the starting condition, i.e. at a temperature below the gelatinization temperature, a mass thus designed has good flowing properties, while products having the above-mentioned favorable properties are obtained thereby. In particular when using a mass containing between 30–50% dry substance, particularly favorable results are achieved thereby.

The above-mentioned percentages are in each use mentioned for suspensions used, not for any prefoamed mass. The percentages present therein can easily be derived from these compositions.

By building up the products according to the invention from dish or sheet parts each having at least one slight thickness with regard to the other dimensions, at least with regard to outside dimensions, voluminous products can be manufactured which can yet be supplied at all points with so much heat during the preparation that the desired extent of cross-linkage occurs. Thus, dish-shaped products can be manufactured, that is, also block-shaped products, with, for instance, a recess in which a product to be packaged can be wholly or partly received, and filler blocks for, for instance, packages, can be manufactured. Also, for instance through extrusion, for instance hollow or finned profiles can be manufactured. A further advantage of the relatively thin sheet parts is that, as a result, a relatively great flexibility is obtained while the products yet maintain the desired strength properties and volumes.

By making use of a batter which is liquid below the gelatinization temperature, preferably at room temperature, supply of the batter can be realized in a simple manner, for instance via pipes and using simple pumping means. Moreover, a stock of the batter can be priorly prepared and be fed to a processing apparatus directly from a storage tank. In this connection, the liquidity of the batter provides the advantage that the flow paths in the mould can he particularly long. The water in the batter functions as blowing agent and moreover, upon evaporating from the mould, provides space for the expansion of the cells.

The batter preferably consists entirely of constituents coming from renewable sources, in particular in the form of a suspension. As a result, good flow properties of the batter are maintained and crude starting material such as starch can be used, for instance potato starch or tapioca. Moreover, such a suspension can be simply stored, at least better than a mixture already gelatinized.

Mentioned as suitable natural polymers are native starch, for instance potato starch, maize starch, wheat starch, waxy maize starch, tapioca starch, pea starch, high-amylose starch or rice starch. Preferably, however, potato starch is used with an amolypectin content of between 75 and 100%. Starch derivatives can also be used, for instance, starch which has been modified by etherification, esterification, acid hydrolysis, oxidation, cross-linking and/or the action of enzymes.

The use of relatively dry, optionally slightly prefoamed starting material provides the advantage that relatively little water or other moisture needs to evaporate in the mould, which has appreciable energetic advantages, the more so since the mass only needs to be heated in the mould, not in the pre-stage. The mass can for instance consist of granulate material, in particular more or less spherical particles having small to very small dimensions with respect to the passage openings to and in the mould. This granulate material can contain a blowing agent, for instance in the form of water or blowing agents simply released and/or evaporating upon heating, such as bicarbonates, which provides for gas evolution through decomposition at elevated temperature.

As starting materials, for instance, the natural polymers mentioned in respect of the batter can be used.

In a further advantageous embodiment, a method according to the invention is characterized in that as mould an injection mould is used.

By making use of an injection mould in a method according to the invention, products can be manufactured with both regular and irregular shapes, which are dimensionally stable and can have varying wall thicknesses. Products manufactured in this manner can, for instance, be used as sheet and dish parts, trays and boxes and like dish-shaped packages and as filler for, for instance, packaging products in boxes and the like, and as constructional or building part. One of the important advantages that can be achieved with this method is that a greater freedom in design is obtained than when platen sets are used. The products can be manufactured in withdrawable as well as non-withdrawable manner, since divisible cores and the like can be readily utilized. As a result, for instance undercuts can be integrally moulded. Moreover, greater differences in height can be incorporated in the product in that the flow path can be longer and gravity has no influence, at least no appreciable influence, on the distribution of the mass.

In a further advantageous embodiment, a method according to the invention is characterized in that an extension die is used.

When nursing an extrusion die in a method according to the invention, sections and the like can be manufactured in a simple manner with the above-mentioned advantages of the cross-linked structure of the natural polymers. Owing to the mass being supplied in cold, preferable liquid form, the preparation thereof is particularly simple and products with the desired properties can be manufactured in substantially one processing pass. In this manner, for instance, sheets and sections can be extruded which are used in great lengths or can be divided up and, for instance, be used as loose filler in the packaging of products in boxes, crates, bags, as decorative parts, as constructional element and as building part and the like. Extrusion and the use of an extrusion die should herein be understood to mean in particular forcing a moulding mass under pressure through a relatively small orifice, this orifice determining substantially at least one cross section of the product. The delivery pressure can, for instance, be generated with a pump or a plunger.

Products that are manufactured with a method according to the invention can in a general sense be designed light with respect to the volume, have sufficient strength and elasticity and are properly resistant to different conditions, in particular when using a "skin" with a relatively high density and a core with a relatively low density.

During the manufacture of the products according to the invention, gas formation through evaporation of water or under the influence of blowing agents occurs so fast that foaming occurs concurrently with or preferable prior to the gelatinization. At elevated pressure and/or temperature this effect is achieved, while further more solid material is "compressed" as cell wall. This not only yields a core made up of a large cells with firm cell walls but also skin layers with a higher degree of densification of firm small cells.

In addition, there may be a number of other conditions that must be met to obtain the desired result.

The colloidal particles and corresponding conditions must meet requirements to provide for the formation of foam, which requires, among other things, a particular load and particular surface tensions, in conjunction with an internal and external pressure in the foam bubbles.

The charging of the mould cavity must be complete within a very short time, which entails requirements for the "flow" properties and the thrust: during this short period the "flow" properties must remain sufficient to ensure complete filling, while the driving force, the propellant or "foam" gas, must remain present in a sufficient amount to advance the mass (which is increasingly hard to move). Flow should herein be understood to include both the flow of a liquid, such as the liquid batter, and the flow of a granulate-form, relatively dry substance such as small rolling and sliding granules or powder, whether or not in slightly prefoamed form.

Accordingly, the length of the flow path is at least dependent on the liquidity of the starting material and, given equal conditions, will be greater for a liquid or suspension than for granulate material. Moreover, the length of the flow path will be positively influenced by a greater difference between the low supply temperature and the temperature of the mould during the baking. Surprisingly, it has been found that when fibers, in particular natural fibers, are added to a mass for use in a method according to the invention, the flow properties are not, or only to a very slight extent, adversely affected, particularly in the case of relatively short to medium-length fibers. Fibers to be used will on average have a length of between 0.5 and 10 mm, maximally a length of about 130 mm, and average diameters between 1 and 100 $\mu$m. The fibers can be branched as well as unbranched, open or still closed, while they may contain lignin and may comprise fiber fibrils. Short fibers have a length of less than 1 mm, long fibers have a length of more than 4 mm, medium-length fibers have a length of between 1 and 4 mm. Thus, if so desired, the fiber distribution in the mold, and accordingly in each product manufactured, can be uniformly obtained, so that the product properties are regularly obtained.

The invention further relates to apparatuses suitable for use in a method according to the invention.

Such a package has the advantage that it can be considered a so-called mono-material package, so that the package can as a whole be incorporated into the same water flow, in particular a paper, cardboard and recycling flow. To manufacturers as well as users, this has the advantage of involving only a slight environmental burden, while the user does not have to separate the package and present it separately, while the manufacturer is not forced to take back the separated package parts and/or does not have to pay a relatively high compensation for the eventual processing of the package. The fibers in the product, manufactured according to the invention, offer the advantage of having a paper-like or cardboard-like appearance, so that it will be directly clear to the consumer that this package can be incorporated into a paper-waste flow. Moreover, in view of the filling of the mold, indications such as names and recycling symbols can readily be included, in relief, in the product. Owing to the dense skin, it can be printed in an excellent manner.

Further advantageous embodiments of methods, apparatuses and products according to the invention are presented in the subclaims.

The invention moreover relates to products manufactured with a method and/or in an apparatus according to the invention.

Products manufactured according to the invention can be considered to be paper-like products.

BRIEF DESCRIPTION OF THE DRAWINGS

To clarify the invention, exemplary embodiments will be described with reference to the drawings.

DETAILED DESCRIPTION OF THE INVENTION

Figure 1:
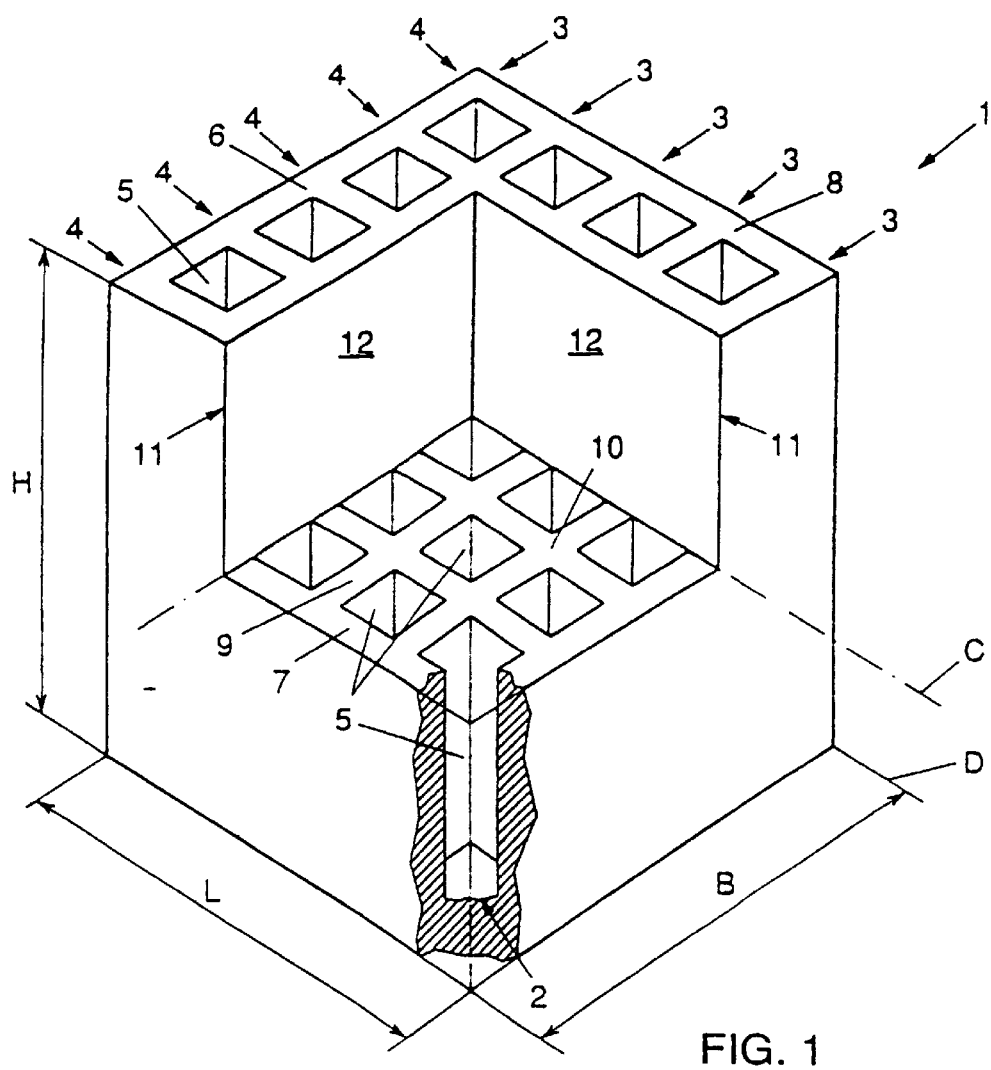
FIG. 1 shows a product, in particular a filler block, manufactured by injection moulding, in perspective view with a part broken away.

The product shown in FIG. 1 is a filler block 1, for instance suitable for locking a housing of a computer C in a box D with a proper fit. The computer C and the box D are schematically represented in broken lines and are mentioned only by way of example. The filler block 1 consists of a body 2 and a number of first 3 and second ribs 4 extending downwards from the body 2. The first 3 and second ribs 4 extend approximately at right angles to each other. Enclosed between two first ribs 3, two second ribs 4 and the body 2 is a cavity 5 of approximately rectangular cross section. The overall dimensions (length L, width B and height H) of the filler block 1 are large with respect to the amount of material used, and hence with respect to the weight, compared with a comparable solid block of the same material and certainly with regard to a comparable block manufactured from paper pulp or like material, which will have to be of a substantially solid construction.

The first ribs 3 have a first part 6 which is relatively high with respect to a second part 7 thereof. The second ribs 4 likewise have a first part 8 which is relatively high with respect to the second part 9 thereof. The relatively high parts 6, 8 are arranged together, as are the relatively low parts 7, 9. The low parts 7, 9 thus define an imaginary bottom surface 10. The approximately vertically extending transition parts 11 between the high parts 6 and 8, respectively, and the low parts 7 and 9, respectively, define two imaginary wall surfaces 12 which include an angle with each other and with the bottom surface 10. The bottom surface 10 and the wall surface 12 define an imaginary space in which, for instance, a corner of the computer C can be received.

When the computer C is accommodated in a box D, the filler block 1 is received between the computer C and three wall panels of the box D with a proper fit. Preferably, such filler blocks 1 or comparable, suitably shaped filler blocks 1 are fitted between the computer C and the box D at several points, so that the computer C is prevented from shifting and moreover a shock-absorbing capacity is obtained, so that damage is avoided. It is noted that the ribs can be arranged in various orientations and positions with respect to each other and the body 2, and more or fewer (groups of) ribs can be used. Thus, for instance, the body can be arranged on the side proximal to the product to be accommodated, so that a greater contact surface between the product and the filler block is obtained. In addition, cavities 5 can be open in different directions, or at least locally all or some ribs can extend in one direction only and, for instance, have a meandering, sinusoidal or otherwise bent shape. Further, openings and recesses can be provided in the ribs and/or in the body. These and many other modifications are considered to fall within the scope of the invention.

The filler block 1 according to FIG. 1 is preferably manufactured by injection moulding in a mould as will be further described hereinafter. The manufacture of the filler block 1 will be described starting from a batter S which comprises at least natural polymers. The batter is preferably a solution or suspension, and in particular a suspension of starch or one or more of such natural polymers and fibers, in particular fibers of annual plants and/or recycled fibers, for instance cellulose from paper, cardboard or wood waste, in water. As will be further described hereinafter, it is also possible to start from a relatively dry starting material, for instance granulate material, and other compositions can also be used. A choice for a batter or, for instance, granulate material, can for instance be made depending on the desired supply means, desired energy consumption, flow paths in the mould and in the feed track, availability of starting materials and the like. In this description, "gelatinization" is intended to refer to a change of a natural polymer from a slightly or completely loose granular or comparable granulate form into a dry or non-dry and/or foamed cohesive form, in which stretched polymers are present. That is to say, a transition occurs from a solid substance, a colloidal solution or suspension to a more homogenous fluid mass.

The batter is liquid at room temperature and slightly above that, at least below the gelatinization temperature of the polymers or at least the greater part thereof, which renders it easy to process, since the suspension has a good flow behaviour and can simply be pumped. This provides the additional advantage that the polymers are not damaged during supply, for instance by an extrusion press screw. Moreover, such a suspension can be manufactured and preserved in a simple manner. Surprisingly, it has been found that the flow behaviour is not adversely affected by the fibers, in particular not if they have a length of between 0.05 mm and 130 mm, in particular between 0.5 mm and 20 mm. Particularly advantageous are fibers having a length of between 1 mm and 5 Êmm. Preferably, the diameter of the fibers is between 0.5 $\mu$m and 100 $\mu$m, more in particular 1 and 50 $\mu$m. Particularly advantageous are fibers having a diameter of between 10 $\mu$m and 40 $\mu$m. As fibers, for instance wood, straw, grass, cane, reed, bamboo, jute, hemp, bast, leaf, seed fibers are suitable, but also other fibers such as coleseed fibers or the like. These examples should not be given a limitative interpretation. A further advantage is that starch is a raw material which is simple to obtain, cheap, and present in abundance, which, moreover, in contrast with, for instance, products based on mineral oil and the like, is continuously replenished (renewable resources). The same holds for the natural fibers used. The water at low temperatures serves as solvent or suspending agent and as liquefier and, upon strong heating, as blowing agent. As desired, additives can be added to the suspension, such as for instance emulsifiers, liquefiers, other blowing agents and colouring and flavouring substances. In addition, ingredients conventional in the paper industry can also be added, such as resin glues, natural and chemical retention agents, biocides (mold and bacteria inhibitors), anti-foaming agents, paraffin emulsions and the like. If necessary, for instance thermoplastic plastics can be added in relatively small amounts, for instance for a further improvement of the strength properties or for a further improvement of the resistance to moisture and temperature influences or to wear.

In an alternative embodiment, the starting material is a substantially dry, granulate-form mass M, which will be further explained hereinafter.

Figure 2:
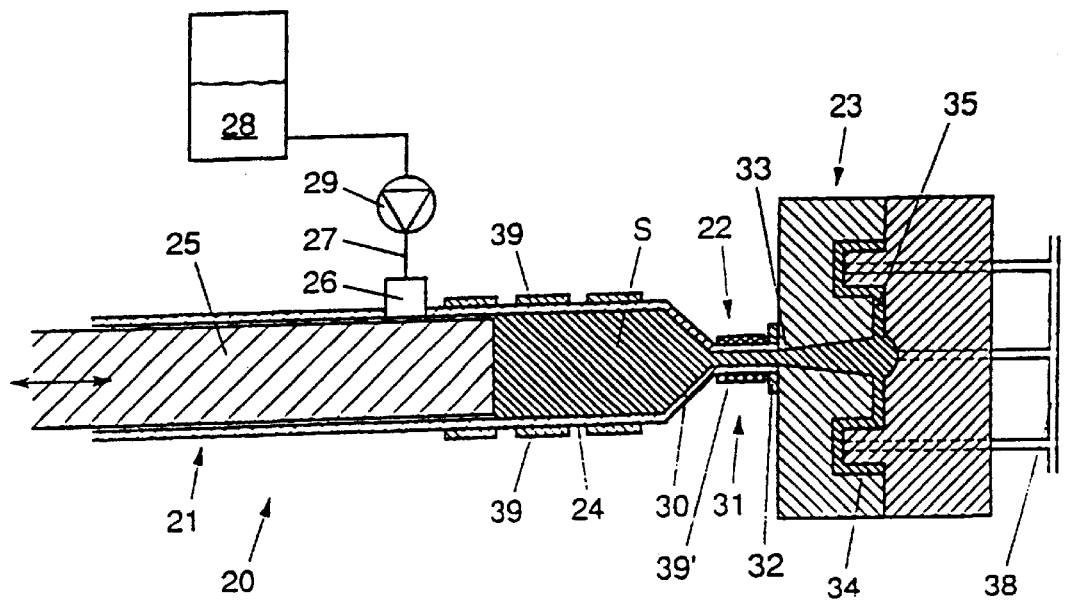
FIG. 2 schematically shows in cross-sectional view an injection-moulding apparatus according to the invention.

FIG. 2 schematically represents an injection-moulding apparatus for use with a method according to the invention, together with a mould suitable for the manufacture of a product according to FIG. 1.

The injection-moulding apparatus 20 comprises a supply device 21 for a batter S, a spray nozzle 22 and a mould 23. The supply device 21 comprises a cylindrical wall 24 with a plunger 25 movable therein with a proper fit. At a first end the cylindrical wall 24 connects to the spray nozzle 22, and remote from the spray nozzle 22 a supply opening 26 is provided in the wall 24, to which a supply pipe 27 for a batter is connected. The batter S is for instance supplied from a storage tank 28 utilizing a pump 29.

In the exemplary embodiment shown, the spray nozzle 22 consists of a conically shaped first part 30, tapering in the direction away from the wall, and a second part 31, connecting thereto, of circular cross section, which second part 31 is narrow with respect to the cylindrical wall 24. Via a thermally separating connecting piece 32, the second part 31 connects to a gate 33 of the mould 23. Further included are means, not specifically shown in the drawing, for shutting off the supply opening 33, after the introduction of a suitable amount of batter into the mould. These means can for instance be part of a plunger 25 or be formed by valve means or the like. The thermal separation between the supply means and the mould and the or each product to be formed therein should be maintained by these means.

Figure 2A:
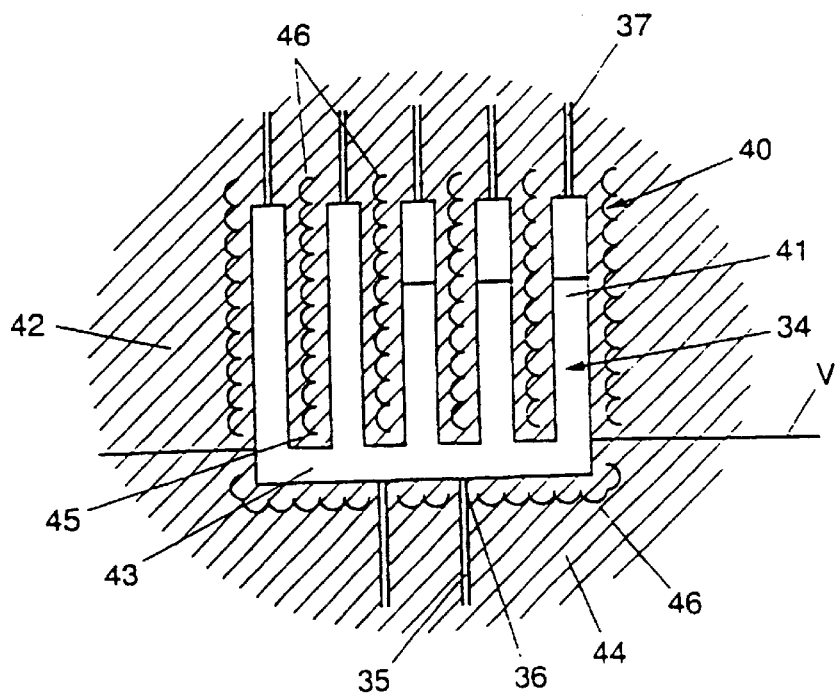
FIG. 2a shows on an enlarged scale a part of a mould, with mould cavity, in cross-sectional view.

Provided in the mould 23 are a number of mould cavities, which will be further described hereinafter and two of which are depicted. Different numbers of mould cavities can be provided, which are identical or different. The mould cavities 34 are connected to the gate 33 via mould channels 35 (FIG. 2a). Connecting to the or each mould cavity 34 at a point remote from the mouth 36 where the relevant mould channel 35 opens into the mould cavity 34 are one or more deaeration channels 37 which are in communication with the environment. This communication is preferably free, but may also be adapted to be shut off, for instance by a pressure relief valve. The mould 23 is suitably divisible along a plane V which intersects the or each mould cavity, in such a manner that products formed in the or each mould cavity can be simply removed therefrom. Further, for the or each mould cavity 34, withdrawal or eject means 38 may be provided for pushing clear the products formed.

Arranged around the cylindrical wall 24 are means 39 for cooling the batter S. Cooling should herein be understood to mean maintenance at a temperature which is below the temperature at which gelatinization of the natural polymers in the batter occurs. These cooling means can for instance consist of coolant-conveying pipes 39. Such cooling means 39' are likewise arranged around the spray nozzle 22. The mould 23 is entirely and/or locally heated utilizing heating means 40 incorporated therein. The thermally separating connecting piece 32 contributes to a thermal uncoupling of the supply device 21 and the mould 23. Cooling of the section 21, 22 of the apparatus upstream of the mould 23 prevents the occurrence of gelatinization, cross-linkage or chemical change in the suspension in the supply device, which would adversely effect the flow properties thereof in particular.

The mould 23, of which FIG. 2a shows a part with a mould cavity 34 on an enlarged scale, contains different heating means 40. In the exemplary embodiment shown, the mould cavity 34 is defined by a number of slotted recesses 41 intersecting each other approximately at right angles, in a first part 42 of the mould 23, and a trough-shaped hollowing 43 in a second part 44 movable against the first part 42 of the mould. The depth of the hollowing 43 is small with respect to the width and the length thereof; the width of the recesses 41 is small with respect to the depth and the length thereof. When the first part 42 is clamped against the second part 44, the mould cavity defines a space corresponding with the shape of the product according to FIG. 1.

In the projections 45 formed between the recesses 41, a heating element 46 is included, for instance an electric heating element. It is noted that the mould parts can also be heated indirectly. On the side of the hollowing 43 remote from the dividing plane V, likewise heating elements 46 are included. The temperature of the different heating elements is preferably controllable individually, but several or all heating elements may also be coupled. In addition, the mould can be heated externally from one or more sides, for instance electrically or by steam or gas burners. Through the heating elements 46 and optional other means, the temperature of the mould can be raised in such a manner that in the mould cavity 34 during use, as desired, at all times and at all points the desired high baking temperature is achieved and maintained.

The injection-moulding apparatus according to FIGS. 2, 2a can be used as follows.

The mould parts 42, 44 are clamped against each other and the eject means 38, if any, are set in the rearmost position, outside the mould cavity or mould cavities 34. The plunger 25 is moved in the direction away from the spray nozzle 22, beyond the supply opening 26. As a result, the supply opening 26 is cleared and the interior of the supply device 21 and the spray nozzle 22 are filled with batter S. The cooling means 39, 39' and the heating means 40, 46 are switched on in such a manner that the different parts are adjusted to the desired temperature and so maintained. To that end, the temperature can be maintained constant or be varied during the baking and/or cooling time. The plunger 25 is moved forwards over a short distance, so that an amount of batter is pressed into the mould and into the mould cavities 34 under high pressure, whereafter the gate 33 is shut off, under a suitable thermal separation. In the mould cavities 34 the batter is brought to the desired temperature, for instance between 150° C. and 350° C., and maintained at that temperature for a "baking time" of, for instance, 2 minutes. As a result, gelatinization and subsequent cross-linking of the (natural) polymers occurs, and bonding to the fibers. In addition, the strongly heated water and/or other liquids evaporate from the batter, giving rise to the formation of bubbles. In the batter, bubbles are formed which are partly encapsulated by the cross-linked structure. This yields a foam structure, which can be further enhanced by adding extra blowing agent. In order to allow substantially all of the evaporating moisture to escape from the mould, a sufficiently large number of vents are provided. After the baking time, the mould 23 is opened in two or more parts and the products are taken from the mould cavities 34 or pushed out of them using the ejectors 38.

Upon heating of the suspension to a temperature above the gelatinization temperature, and at least above the gas formation or vaporization temperature of the or a blowing agent, within the suspension gelatinization of the polymers occurs and moreover bubble formation as a result of evaporation of the water. For starch, the gelatinization temperature is for instance in the range of 54–65° C. Upon further heating of the suspension, cross-linking of the polymers occurs, yielding a firm, relatively dense structure around cells that result from the evaporation of the water and optional other blowing agents and around the fibers extending within the wall of the product.

Figure 1A:
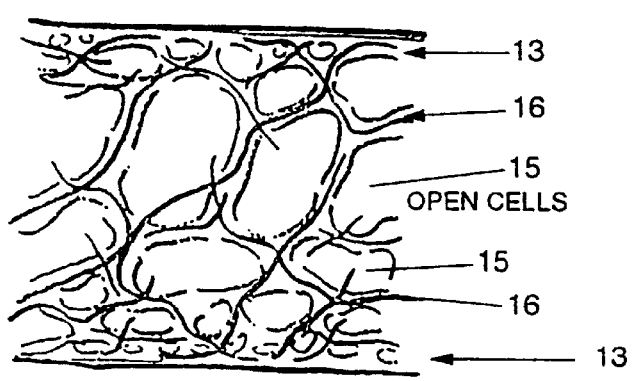
FIG. 1a shows, on an enlarged scale, twice a cross section of a wall of a product according to FIG. 1.

The injection-moulded product has an at least substantially closed skin 13 of closed cells and a foamy core 14 which comprises open cells 15 between and through which fibers extend that have a relatively great length relative to the cells. In FIG. 1a, on an enlarged scale, a cross section through one of the ribs 3 is shown. The closed skin 13 provides for a good resistance to external influences, such as for instance moisture and temperature, while the core 14 provides, among other things, for a large volume combined with a relatively small weight and for good resilience. Further, the skin 13 has a rigidity- and strength-enhancing effect. The walls 14', as a result of the baking, have a firm skeleton.

The fibers 16 extend within the wall of the product relatively at random, while, because of the flow behaviour during the filling of the mould, a preference occurs for orientation approximately parallel to the skin 13 and along the cell walls. Hence, each fiber 16 is in contact with a series of cells in the skin 13 and/or the core 14. Consequently, the cell acquires a relatively high bending strength and tensile strength. Moreover, in the event of an overload, the wall may tear without directly involving breaking. That is to say, in the event of an overload, the different parts of the product remain interconnected, so that no fragmentation occurs. This prevents large amounts of loose, separate waste parts. However, the product can nevertheless easily be reduced through flattening, so that the product as waste takes up relatively little space.

The fibers 16 are always completely surrounded by the batter, or at least the mass, so that they are not exposed in the surface, yet a part of the fibers is in fact visible in the surface, which may give the product a fibrous, paper- or cardboard-like appearance. This has as an advantage that it is clear to the user that, after use, the product can be included in a paper-recycling flow as if it were old paper, which is preferred from an environmental viewpoint. If so desired, for instance by coating the fibers, this effect can be enhanced or, by contrast, prevented.

The skin is dimensionally stable, which enables, for instance, its being printed on, as well as the provision of relief using the or each mould cavity.

As long as the skin 13 remains closed, moisture absorption by the product is adequately prevented or at least slowed down to a great extent. Through a suitable choice of the ingredients, the temperature build-up and the pressure build-up in the mould cavity, the properties of the product can be influenced, for instance in that the skin 13 is thinner or thicker with respect to the core 14 and in that the core 14 and the skin 13 are cross-linked to a greater or lesser extent ("well-done"). By variation of the temperature in time and/or in the different parts of the mould, and in particular by changing the temperatures of the different projections 45, the properties of the different parts of the product can be changed, so that, for instance, the elasticity of the parts can be different.

In contrast with the known method in which use is made of platen sets, with injection moulding, first the mould cavity is closed and only then is the batter introduced into the mould. As a consequence, the total volume of the mould cavity can be greater than the volume of the separate mould cavity parts as contained in the mould's first 42 and second part 44, respectively. In fact, in the known method, the batter is to be introduced into a cup-shaped cavity and held therein until the mould is closed. When the mould is being closed, the batter moreover cannot be allowed to be pressed away across the edges because it will then flow between the land areas and prevent closure of the mould or at least render it more difficult. In the known method, therefore, the total volume of the closed mould cavity should be considerably smaller than the volume of the cup mould, which moreover initially includes all of the moisture which subsequently evaporates. Further, the use of platen sets entails the risk that the mass standing still in the open mould causes separation, as a result of which the properties of the product will vary and, moreover, will not be equal for all products. In a method according to the invention, the pressure during the introduction into the mold prevents this, so that a constant distribution is realized, in particular also of the fibers, or at least the desired distribution is always realized.

Figure 3:
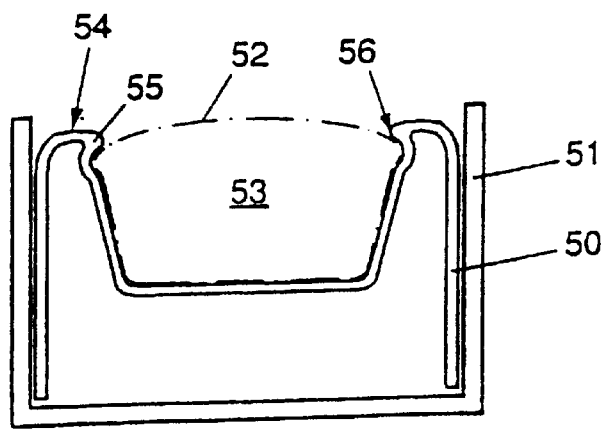
FIG. 3 shows a product, in particular an inner tray and a storage box, manufactured by injection moulding, in cross section.

FIG. 3 shows a cross section of an inner tray 50 in a storage box 51, in which inner tray 50 for instance a household appliance 52 can be accommodated. The inner tray 50 is dish-shaped, that is, at least for the most part thin-walled, and has a receiving cavity 53. Situated adjacent the upper edges 54 of the receiving cavity 53, on opposite sides, is a clamping projection 55 which is formed integrally therewith and has an undercut 56 under which the shaver 52, which is shown in broken lines, can be pressed down. The inner tray has been formed by injection moulding, utilizing a divisible core. As a consequence, the clamping projections 55 can be integrally injection moulded. Accordingly, the method according to the invention also enables the manufacture of non-withdrawable products in one processing pass, which renders such products particularly suitable, for instance, as packaging material, storage material and the like, but also as filling material, for instance for sandwich-shaped construction parts, for housings and the like.

The inner tray 50 and the storage box 51, which is for instance manufactured as outer package from cardboard, can together be incorporated into the paper-recycling flow, so that the total package can be regarded as monomaterial package.

Figure 4:
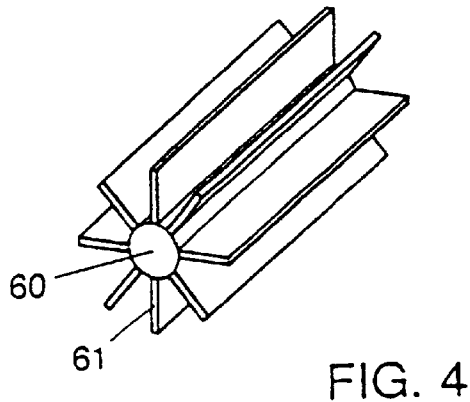
FIG. 4 shows a product manufactured by extrusion, in perspective view.

FIG. 4 shows a filler product 60, in the form of a so-called "loose fill material", a filler product 60 which is used for packaging products in a shock-absorbing manner in, for instance, boxes, cases, crates or like packages. To that end, a multiplicity of the filler products 60 are loosely poured into the space between a product (or products) to be packaged and the package, whereafter the package can be closed and movements of the packaged product within the package are prevented or at least accommodated in a shock-absorbing manner. To that end, the loose fill material is slightly elastically deformable.

The filler product 60 as shown in FIG. 4 comprises an approximately cylindrical core 61 and a number of fins 62 extending approximately radially from the core, and which extend throughout the length of the core. The fins are relatively thin with respect of their height and length, so that they exhibit a measure of bending slackness. The circumference of the filler product 60, measured along the tops of the fins 62, is largely determinative of the volume the filler product occupies, so that a favourable volume-to-weight ratio is obtained.

Figure 5:
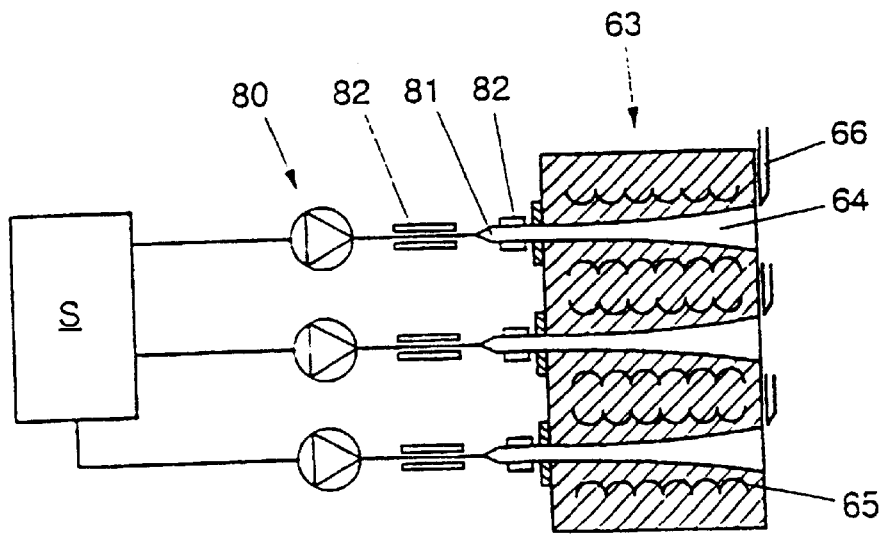
FIG. 5 schematically shows in cross-sectional view an extrusion apparatus according to the invention.

The filler products according to FIG. 4 and similar for instance lengthwise symmetrical products can be formed by extrusion on an apparatus according to FIG. 5. The extrusion apparatus comprises a supply device comprising means 80 for the (semi)continuous pressurized supply of batter S or a granulate-form mass M, whether or not pre-foamed to some extent, from a storage tank to a spray nozzle 81, for instance utilizing one or more pumps. Connecting to the spray nozzle 81 in this extrusion apparatus is an extrusion die 63 which comprises one or more extrusion orifices 64 of a cross section which substantially corresponds to, at least is similar in shape to, the cross section of the filler product to be obtained. The supply device 80, and in particular the spray nozzle 81 are provided with cooling means 82, for instance as described in the foregoing. The extrusion die comprises heating means 65 which are arranged in such a manner that at least in the extrusion orifices the temperature can be accurately controlled, for instance to 210°0 C. to 255° C. Arranged on the side of the extrusion die 63 remote from the supply device 80 is a cutter 66 by which extruded sections can be cut into short lengths upon exiting from the extrusion orifices.

The apparatus according to FIG. 5 can be used as follows.

From the supply device 80, a continuous flow of batter or a mass M in granulate form, whether or not in a slightly pre-foamed condition, is fed via the spray nozzle 81 to the heated extrusion die 63 and forced through the or each extrusion orifice 64. The leading part of the batter gelatinizes and proceeds to cross-link, whereby the moisture evaporates from the batter and provides for the foaming of the product, optionally together with additional blowing agents and other additives, while the fibers will extend within the fins and the core, substantially in the longitudinal direction of the core and radially and in the longitudinal direction in the fins. As a result, also in the case of tearing, the fins will not come loose from the core. The filler products are relatively strong and resilient particularly because of the fibers. Preferably, the cross section of the or each extrusion orifice 64 widens slightly in the direction of extrusion, in such a manner that during the foaming of the product, as the baking batter S is being passed through the extrusion orifice, the pressure that is exerted on the filler product 60 is sufficient to obtain the desired skin and core properties, without the cross-linked structure thereof being broken or otherwise damaged by the extrusion die.

As a result of the continuous supply of batter, the "baked" part of the extruded section is pushed forward, in such a manner that it leaves the corresponding extrusion orifice 64. On the leading side, each time a part of the section is cut off, whereby the cut surface is closed. In this manner, at a relatively high rate and at relatively low cost a large amount of loose fill material can be manufactured from a liquid batter or sections in great lengths, and can for instance also be in sheet form. These filler products are environmentally friendly.

When the batter is liquid, preferably in the form of a solution or suspension, manufacture, storage, transport and dosage thereof are particularly simple and in a method according to the invention use can be made of a simple apparatus, which renders these methods relatively cheap. Further, in most embodiments the natural polymers need not be subjected to any expensive pretreatments before they can be used. They only need to be included in the batter.

In the foregoing, methods and apparatuses have been described for manufacturing products with a foamed structure using an injection-moulding technique and an extrusion technique, the starting material being a liquid batter, in particular a solution or suspension. However, as indicated, it is also possible to start from a substantially dry mass consisting of, or at least comprising, for instance, a granulate material. The granulate material can, for instance, comprise more or less spherical particles having small dimensions with respect to the orifices in the moulds and supply means. Like a liquid, these particles can display a certain flow behaviour, as a result of which, under pressure of the supply means, they can fill the mould or be conveyed through it. The particles used have dimensions and shapes such that, together with the other ingredients, they can form aggregates of particles.

The particles which can contain, for instance, water or a different blowing agent in relatively small amounts, are heated after being introduced into the mould and will swell as a result, since the blowing agent present will blow up the particles, just as in the case of the particles included in the solution or suspension. With such a starting mass too, the polymers will provide for a high degree of cross-linkage and hence a firm cell wall of the blown cells. The fibers will adhere to one another and to the batter to form one or more networks. It is true of such a method too, that the mould as hot part together with the pressure and the blowing agent will lead to a high degree of densification of the outer parts of the walls of a product, the so-called skin, while the core will contain larger cells.

Due to the fact that in this method less moisture is included in the starting mass, relatively little energy is necessary therefor, in that less heat is needed for the evaporation. This is precisely what is of particular importance for the manufacture of products according to the invention, foamed paper-formed, in view of the environmental advantages that can be achieved with such products. Partly as a consequence of relatively cheap raw materials and high production rates that can be achieved, thus a low-energy, environment-friendly and economically advantageous production method has been obtained for products that present few environmental problems, if any, also in the downstream stage, that is, as waste.

For that reason too, products according to the invention are practical for use as packaging material or construction material, while moreover they do not present any problems regarding static charge.

The paper-like products manufactured according to the invention have for instance a density of less than 1000 g/l, more in particular a density of between 100 and 800 g/l. However, other densities are also possible.

When a mass M in granulate form is used, of course a different flow behaviour occurs than if a batter S is used. Moreover, not every starting material is suitable for use as or in granulate form, at least not advantageously so. Moreover, when using granulate material together with fillers, or combinations of granulate materials, it is sometimes not easy to prevent separation or to obtain and/or to maintain a good constant mixing.

In order to improve the appearance of the products, a colorant can be added to the batter. For that purpose, the fibers can for instance be coated completely or partly. Also, a surface layer can be formed, for instance through texture differences or by variation in temperature of the mould at different positions across the surface, so that local changes occur in the skin as a result of different baking conditions. Naturally, it is also possible, after manufacture, to provide parts of the product with a coating, coloration or printing. Furthermore, it is possible to mould in, for instance, inserts in the product.

By way of illustration, examples are given of methods according to the invention, which should not be construed as being limitative in any way.

EXAMPLE 1

From 644 g tap water, 6 g polymethyl hydrogen siloxane, and 50.5 g recycled cellulose, a solution was prepared. The recirculated cellulose consisted on average for 75% of short cellulose fibers and for 20% of fiber binders. The other parts were various inert fillers. This raw material was introduced in the form of a selected type of old paper (newsprint). To the solution, 251 g potato starch (FoodGrade PotatoStarch, 80% dry substance (80% amylopectin, 20% amylose) and 20% water) were added with continuous stirring, followed by 0.8 g xanthan gum (Keltrol F), 0.9 g calcium hydroxyorthophosphate, 17 g kaolin (China Clay Spes), 20 g calcium carbonate, and 0.5 g acidity regulator (sodium dihydrogen phosphate). After all components had been added, stirring was continued for about 10 minutes. Through the thus obtained suspension, 8.5 g hemp fiber (2–5 mm) and 0.8 g blowing agent (sodium-bicarbonate) were mixed.

After a liquid batter was stirred from this, it was introduced into a supply device of an injection-moulding machine. The injection-moulding machine employed is of the type EPS-10, from the firm Thermoware of Barneveld. This apparatus comprised a mould with ten mould cavities for forming products, each product having a size of 210× 65×45 mm (L×W×H) and a wall thickness of 3.0 mm. The injection-moulding machine comprised electric heating elements and a plunger-injection device with a shut-off thermally uncoupled from the mould. Per mould cavity, about 70 cc batter was injected under a pressure of 0.5 bar and at a temperature of 20° C. The mould was heated to 300° C., with a temperature tolerance of between 297° C. and 303° C. and the mould was closed with a force of 35 kN per mould cavity. The mould was closed for 90 s and maintained at the required temperature, while each mould cavity was filled entirely with foamed product. During heating, 98% of the water escaped, substantially in the form of vapour, via vents in the mould; this water acted as blowing agent. After 90 s, the mould was opened and the injection-moulded products were pressed from the mould cavities by means of ejectors.

The thus formed products were directly ready for use. Each product has a core of a thickness of about 2.5 mm, covered on opposite sides by a skin of a thickness of about 0.2 mm. Each product had a moisture content of about 2% and a weight of 31 g. The obtained product was firm, form-retaining, and had a smooth surface. After use, the material can be processed in the paper-recycling flow, and is also biodegradable by means of composting.

EXAMPLE 2

In this example, a solution of 514 g tap water and 20 g polymethyl hydrogen siloxane formed the basis for the batter. Added to this—with continuous stirring—were 219 g potato starch (FoodGrade PotatoStarch, 80% dry substance (80% amylopectin, 20% amylose) and 20% water), 100 g acetylated potato starch (perfectamyl AC), 0.7 g xanthan gum (Keltrol F), 0.8 g calcium hydroxyorthophosphate, 20 g kaolin (China Clay Spec), 24 g calcium carbonate, and 0.5 g sodium dihydrogen phosphate. This mixture was well stirred for 10 minutes. In the suspension now obtained, 1.7 g of the retention agent Amylofax and 96 g coated cellulose fiber (coating-comprising crystalline parafine wax) were subsequently mixed. The coated fiber (about 1.5 mm) was to a high degree water-repellent, and minimally water-absorbent. Moreover, the coating provided for the bonding of fibers relative to each other and to the other ingredients, which increased the firmness and strength of the product; even in moist conditions, the product changed minimally as far as size and shape are concerned. Finally, 1.9 g flocculant (aluminum chloride ($AlCl_3$)) and 1.4 g blowing agent (sodium bicarbonate) were stirred through the mixture to obtain a homogeneously smooth raw material. This raw material was processed as in Example 1, but now with an injection volume of 50 cc per mould cavity, under a pressure of 1 bar. The mould was set at 275 degrees Celsius and was closed for 110 s.

The result was a product comparable with Example 1, in which the water and moisture resistance now became much better: the product was water-resistant for a much longer period, i.e. the firmness and form stability were maintained for a long time. The recyclability in paper, and the biodegradability remained guaranteed.

EXAMPLE 3

A solution of 698 g tap water, 5 g glycerol, and 20 g cellulose fibers (about 2.5 mm) was prepared. During continuous stirring, 65 g potato starch (FoodGrade PotatoStarch, 80% dry substance (80% amylopectin, 20% amylose) and 20% water), 60 g tapioca starch (FoodGrade TapiocaStarch), 30 g lecithin, 18 g 60 mesh wood flour, 0.4 g xanthan gum (Keltrol F) and 0.5 g acidity regulator (sodium dihydrogen phosphate) were successively added. After stirring for 10 minutes, 1.7 g amylofax as retention agent, 80 g hemp fiber (2–3 mm), 20 g coated (elastic) fiber (about 3 mm) (coating: polyethene, elastomer), and, finally, 1.4 g sodium bicarbonate followed. Stirring was again continued for 10 minutes until a proper distribution was brought about.

The mixture was processed as in Example 1, while the injection volume was 85 cc at an injection pressure of 2.5 bar. As mould temperature 240 degrees Celsius was maintained, during the cycle period of 180 s.

A product of great strength was obtained: only in the case of heavy point loads did the product eventually tear, without breaking into loose parts. For specific applications, this tearing instead of breaking is a highly important condition.

EXAMPLE 4

A solution of 722 g tap water, 10 g melamine, 14.5 g resin glue (urea formaldehyde resin), and 80 g cellulose (about 1.5 mm) was prepared. After that, during stirring, 112 g potato starch (FoodGrade PotatoStarch, 80% dry substance (80% amylopectin, 20% amylose) and 20% water), 0.3 g xanthan gum (Keltrol F), 0.9 g calcium hydroxyorthophosphate, 5.5 g kaolin (China Clay Spec), 6.5 g calcium carbonate, and 0.7 g sodium dihydrogen phosphate were added. After mixing for about 15 minutes, a smooth suspension was formed, in which the following was admixed: 2.5 g AKD (Alkyl Ketene Dimer), 42 g coated fiber (coating: polyethene elastomer) as used in Example 2, 1.7 g flocculant (aluminum chloride ($AlCl_3$) and 1.4 g blowing agent sodium bicarbonate.

The suspension was processed as in Example 1. As injection volume 90 cc was needed, at a pressure of 2 bar. The mould temperature was 280 degrees Celsius. The cycle time was 150 s before a finished product was injection-moulded.

As to its functional properties, the product was comparable with the result of Example 2. The rate and degree of biodegradability were lower. The processing in the paper-recycling flow remained guaranteed. The major advantages were found in the durable practical possibilities of the product, at acceptable prices for the raw materials used.

EXAMPLE 5

A batter was prepared in the same manner as in Example 1. At a pressure of 5.5 bar, this batter was continuously fed to an extrusion die with a star-shaped aperture of a cross section of 250 mm² and a length of 50 mm, which aperture was 150 mm long in the downstream direction. The die was heated to a temperature of 255° C., so that approximately 95% of the water evaporated from the batter to form cells, while in the batter gelatinization and cross-linkage of the starch polymers around the cells occurred. Upon leaving the die, a section had been formed with a foam core, covered by a skin of a thickness of approximately 0.1 mm, the product formed being pushed out of the die by the batter being introduced. The thus formed section had a specific weight of approximately 150 g per dm³ and could simply be cut into short lengths for the formation of loose fill material.

EXAMPLE 6

64 g jute fiber (about 1 mm) was mixed in dry form with 18 g cotton threads (3 mm). With continuous stirring, 811 g native starch (FoodGrade PotatoStarch, 80% dry substance (80% amylopectin, 20% amylose) and 20% water) was added. Next, 107 g water, wherein 2 g blowing agent (sodium bicarbonate) and 5 g polymethyl hydrogen siloxane were dissolved, was added. Due to the slight moisture content, a dry, homogeneous granulate material was obtained with the moistened starch granules (having an average diameter of 50 micron) bonding to the moistened fibers: these aggregates of the mixed composition were further processed as granulate material.

The granulate material was introduced into a closed pretreatment apparatus, then brought to a slightly raised temperature of about 50 degrees Celsius, and under a pressure of 5 bar. Through the sudden application of a reduced pressure, in this case through a rapid pressure drop from 5 bar to 1 bar, the starch granules swelled to a diameter of about 100 micron, without involving a significant form of gelatinization. Due to this pre-foaming, the moisture content decreased to about 10%. By means of an airpressure plunger system, 85 cc pre-foamed granulate material with a density of about 100–180 g/l was pressed in an injection mould. The injection mould had a box-shaped cavity with the dimensions 190×125×18 mm and a wall thickness of 3 mm. The mould was kept closed with a force of about 15 kN per cavity and was then heated for about 55 s to about 270° C., whereby gelatinization and cross-linkage of the natural polymers occurred, while the water substantially evaporated from the granules with further foam formation. The thus obtained tray was contiguously removed from the mould.

The tray was dimensionally stable and had a water content of about 1%. The wall of the thus baked product had a core of open, blown and relatively large cells, while the outer sides of the wall had a structure of compact, relatively small and substantially closed cells.

The invention is not in any way limited to the embodiments shown or described. Many variations are possible. The freedom of design which can be achieved with the methods according to the invention is virtually unlimited. Thus all kinds of other products can be manufactured with a method according to the invention, such as for instance trays for chips or snacks, edible containers such as ice-cream cups, sheet, bar and profiled material for all kinds of uses, plate-shaped or preshaped construction material, and, in particular after further preservation, cups for cold and hot beverages, packages for freezer and airplane meals, presentation material and like and many other comparable products. These and comparable variations are understood to fall within the scope of the invention.

What is claimed is:

1. A method of manufacturing a molded product having a blown, foamy structure via an injection mold designed to form said molded product, said method comprising:

forming a fluid mass substantially free of gelatinized matter and having a low viscosity, said fluid mass comprising a natural polymer and natural fibers;

maintaining said fluid mass at temperatures below a gelatinization temperature such that substantially no gelatinization of said natural polymers occurs in said fluid mass outside said injection mold;

injecting said fluid mass under high pressure into said injection mold such that said fluid mass substantially fills said injection mold under said high pressure;

heating said injection mold to raise the temperature of said fluid mass, while under said high pressure, to a baking temperature at least equal to or above said gelatinization temperature, to cause baking of said injected fluid mass with gelatinization and cross linking of said natural polymers, and with bonding of said natural polymers to said natural fibers to form said molded product with said natural fibers extending throughout said molded product; and removing said molded product from said injection mold.

2. A method according to claim 1, wherein the injecting step is such that the pressure under which said fluid mass is passed into said mold is higher than 0.5 bar.

3. A method according to claim 1, further including heating said injection mold to approximately said baking temperature prior to introduction of said fluid mass into said injection mold.

4. A method according to claim 1, wherein the step of heating said fluid mass includes raising the temperature of said injection mold to at least 240° C.

5. A method according to claim 1, wherein the forming step includes forming said fluid mass such that it contains at least 20% water by weight.

6. A method according to claim 1, wherein the forming step includes forming said fluid mass such that it contains less than 20% of a filling material other than said natural fibers.

7. A method according to claim 1, wherein the heating step includes forming said molded product with cells substantially having a wall of natural polymers cross-linked during said heating, while the cell size across the wall thickness varies in such a manner that it decreases in an outward direction.

8. A method according to claim 1, wherein at least a part of said fibers added during said forming step is derived from recycled fibers.

9. A method according to claim 1, wherein at least a part of said fibers added during said forming step originates from annual plants.

10. A method according to claim 1, wherein at least a part of said fibers added during said forming step is coated.

11. A method according to claim 1, wherein the forming step includes forming said fluid mass with between 15% and 75% dry substance.

12. A method according to claim 1, wherein the heating step forms said product with a number of sheet, bar or dish-shaped parts each having in at least one direction a dimension that is relatively small with respect to the total dimensions of said product.

13. A method according to claim 1, wherein the forming step forms said fluid mass as a liquid batter, comprising a suspension or solution of at least said natural polymers.

14. A method according to claim 13, wherein the forming step includes forming said batter substantially of biocompatible constituents.

15. A method according to claim 1, wherein the forming step includes forming said fluid mass from a batter of at least water, said natural fibers and starch, and the heating step includes heating said mold to a temperature of more than 130° C.

16. A method according to claim 1, wherein the injecting step includes introducing said fluid mass into said mold in a relatively dry condition.

17. A method according to claim 16, wherein the forming step includes slightly prefoaming said fluid mass prior to the introduction of said fluid mass into said mold without this giving rise to gelatinization.

18. A method according to claim 1, wherein the forming step includes forming said fluid mass with a blowing agent included in said fluid mass.

19. A method of manufacturing a molded product via extrusion molding with an extrusion die designed to form said molded product, said molded product having a blown, foamy structure, said method comprising:

forming a fluid mass outside said extrusion die, said fluid mass comprising a natural polymer and natural fibers;

maintaining said fluid mass when outside said extrusion die at temperatures below a gelatinization temperature such that substantially no gelatinization of said natural polymers occurs in said fluid mass;

continuously feeding said fluid mass under pressure through an orifice in said extrusion die;

heating said fluid mass while said fluid mass moves through said extrusion die to a baking temperature at least equal to or above said gelatinization temperature, to cause gelatinization and cross linking of said natural polymers to form said molded product with said natural fibers extending throughout; and removing said molded product from said extrusion die.

20. A method according to claim 19, further including heating said extrusion die to approximately said baking temperature prior to feeding said fluid mass through said orifice.

21. A method according to claim 19, wherein the heating step includes forming said molded product with cells substantially having a wall of natural polymers cross-linked during said heating, while the cell size across the wall thickness varies in such a manner that it decreases in an outward direction.

22. A method according to claim 19, wherein the forming step includes forming said fluid mass from a batter of at least water, said natural fibers and starch, and the heating step includes heating said extrusion die to a temperature of more than 130° C.

23. A method according to claim 19, wherein the forming step includes slightly prefoaming said fluid mass prior to the introduction of said fluid mass into said extrusion die without this giving rise to gelatinization.

24. A method according to claim 19, wherein the forming step includes forming said fluid mass with a blowing agent.

* * * * *